United States Patent [19]

Smith

[11] Patent Number: 4,847,757
[45] Date of Patent: Jul. 11, 1989

[54] INTERLEAVED ACCESS TO GLOBAL MEMORY BY HIGH PRIORITY SOURCE

[75] Inventor: Michael Smith, Boness, Scotland

[73] Assignee: Burr-Brown Limited, Livingston, Scotland

[21] Appl. No.: 33,581

[22] Filed: Apr. 1, 1987

[30] Foreign Application Priority Data

Oct. 27, 1986 [GB] United Kingdom ............... 8625666

[51] Int. Cl.⁴ ............................................. G06F 15/00
[52] U.S. Cl. ................................ 364/200; 364/228.1; 364/230; 364/271.5; 364/300
[58] Field of Search ... 364/200 MS File, 900 MS File, 364/300

[56] References Cited

U.S. PATENT DOCUMENTS

| | | | |
|---|---|---|---|
| 4,028,663 | 6/1977 | Royer et al. ..................... | 340/172.5 |
| 4,096,571 | 6/1978 | Vander Mey ....................... | 364/200 |
| 4,096,572 | 6/1978 | Namimoto ........................... | 364/200 |
| 4,130,864 | 12/1978 | Schlotter .......................... | 364/200 |
| 4,151,592 | 4/1979 | Suzuki et al. ....................... | 364/200 |
| 4,189,766 | 2/1980 | Horiguchi et al. .................. | 364/200 |
| 4,214,305 | 7/1980 | Tokita et al. ....................... | 364/200 |
| 4,228,496 | 10/1980 | Katzman et al. .................... | 364/200 |
| 4,257,095 | 3/1987 | Nadir .................................. | 364/200 |
| 4,296,463 | 10/1981 | Dalboussiere et al. ............. | 364/200 |
| 4,399,504 | 8/1983 | Obermarck et al. ................. | 364/200 |
| 4,426,679 | 1/1984 | Yu et al. ............................. | 364/200 |
| 4,453,214 | 6/1984 | Adcock ............................... | 364/200 |
| 4,493,022 | 1/1985 | Nicolas et al. ...................... | 364/200 |
| 4,495,570 | 1/1985 | Kitajima et al. .................... | 364/200 |
| 4,499,538 | 2/1985 | Finger et al. ....................... | 364/200 |
| 4,536,839 | 8/1985 | Shah et al. ......................... | 364/200 |
| 4,541,043 | 9/1985 | Ballegeer et al. ................... | 364/200 |
| 4,558,412 | 12/1985 | Inoshita et al. ..................... | 364/200 |
| 4,571,672 | 2/1986 | Hatada et al. ...................... | 364/200 |

Primary Examiner—Eddie P. Chan
Assistant Examiner—Adolfo Ruiz
Attorney, Agent, or Firm—Cahill, Sutton & Thomas

[57] ABSTRACT

A digital signal processor includes a global RAM that is accessable by an external high priority bus, a microprocessor and an I/O controller. The global RAM is accessed by a global address bus and a global data bus. The global address bus is coupled by separately selectable buffers to a microprocessor address bus, the external address bus, and an I/O bus, respectively. The global data bus is coupled by separately selectable transceivers to the microprocessor data bus, the external bus, and the I/O bus, respectively. Either the microprocessor or the I/O port controller may request and be granted access to the global memory at any time if it is not already being accessed. If the external bus requests access to the global RAM and either the microprocessor or the I/O port controller is accessing the global RAM, multiple wait states are inserted into that microprocessor or I/O port controller until the external bus completes its access. The microprocessor or I/O controller then automatically continues accessing the global RAM.

19 Claims, 4 Drawing Sheets

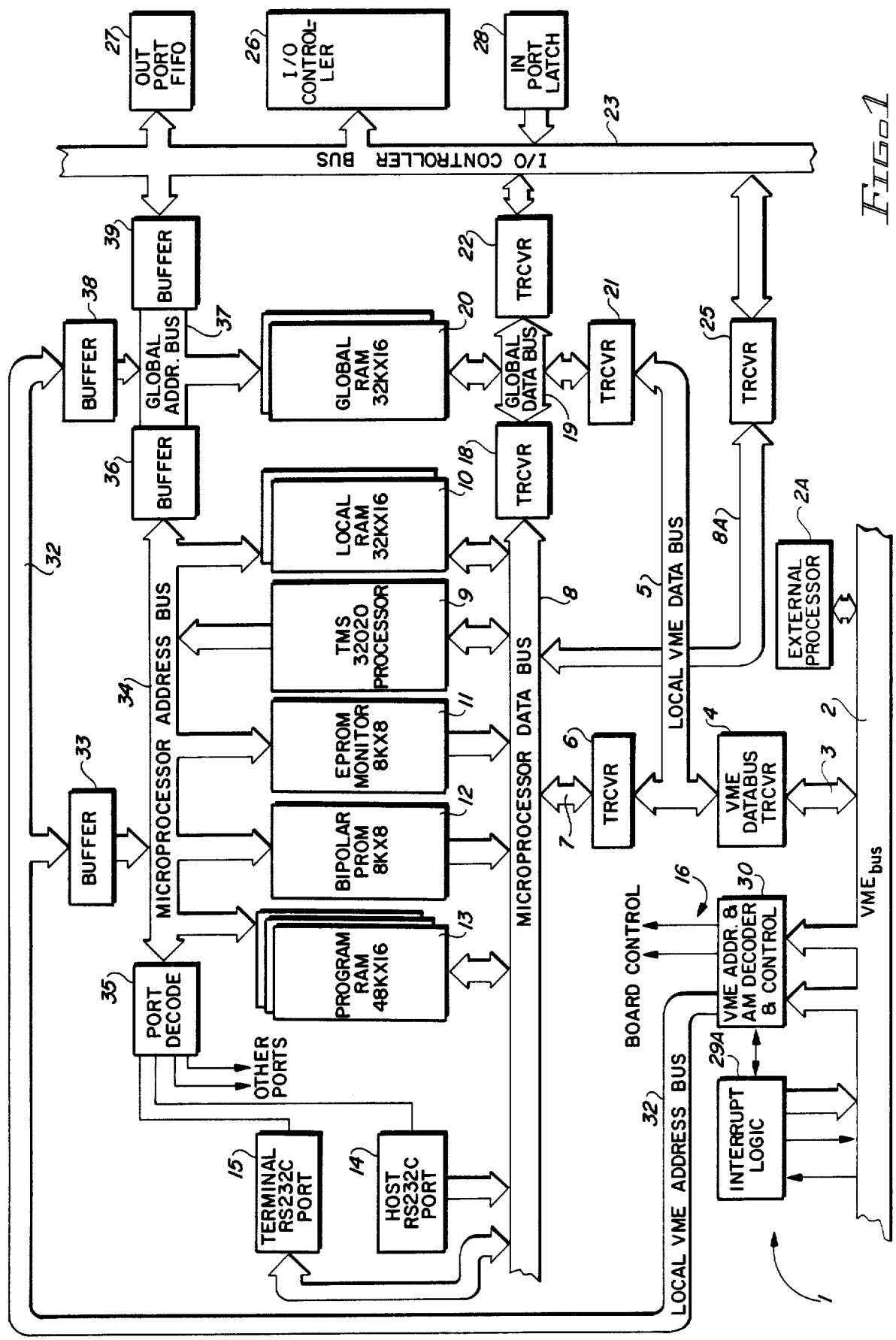

INTERLEAVED ACCESS TO GLOBAL MEMORY BY HIGH PRIORITY SOURCE

BACKGROUND OF THE INVENTION

The invention relates to apparatus and methods arbitrating bus contention conditions arising in a system wherein a first source has absolute priority in accessing a global RAM and other processors have lower priority access to the global RAM.

Digital signal processors such as the assignee's presently marketed SPV100 "adaptable signal processing board" provide programmable functions that allow high speed processing to accomplish various functions such as spectrum analysis, digital filtering, correlation convolution, and matrix inversion. The digital signal processing board is directly compatible with the popular "VME bus". Such products must operate at extremely high speed, and need to be as low in cost and size as possible. To this end, such products should provide optimized arbitrating of bus contention conditions between the VME bus, an internal microprocessor of the digital processing board, and an input/output port controller that is essentially a DMA (direct memory access) controller in order to permit high speed operation at relatively low cost. The SPV100 digital signal processing board requires a data memory and a separate I/O memory. This requirement increases the cost and complexity beyond what is desirable for the functionality achievable by use of that product. Furthermore, it is not possible for the VME bus to readily monitor the data memory, and the I/O memory is not readily accessable or monitorable by the internal microprocessor (a TMS32010) of the SPV100 digital processing board.

Although it is common to provide systems in which a common or global memory can be accessed by a plurality of separate processors, such systems generally have utilized either the technique of equally sharing access to the global memory, where in if one processor is accessing the global memory, the others cannot or else complex priority interrupt systems have been used that interrupt a low priority processor presently accessing the global memory and cause it to execute an interrupt subroutine and grant access to the global memory to the higher priority requesting processor. These techniques and the associated circuitry are so complex that they are not suitable in meeting the objective of providing a low cost, high speed digital signal processing board that can be plugged into a VME bus and accomplish rapid input and output of data to and from the digital signal processor board.

SUMMARY OF THE INVENTION

Accordingly, it is an object of the invention to provide an efficient apparatus and method for a high priority processor or source to access a global RAM that also can be accessed by a plurality of lower priority processors or sources.

It is another object of the invention to provide a system including a global RAM that is accessable by a plurality of different sources, one of which can always access the global RAM, without use of a complex priority arbitration system.

It is another object of the invention to provide a digital signal processor that avoids the need for separate I/O and data memories, yet operates at high speeds when interfaced to a VME bus and a high speed I/O port.

Briefly described and in accordance with one embodiment thereof, the invention provides a digital processing circuit including a microprocessor coupled to a microprocessor address bus and a microprocessor data bus, an input/output controller coupled to an input/output bus, a global memory coupled to a global address bus and a global data bus, an external data bus and an external address bus coupled to an external processor, first, second, and third separately selectable transceiver circuits selectively coupling the microprocessor bus, the input/output bus, and the external data bus, respectively, to the global data bus, first, second, and third address buffer circuits selectively coupling the microprocessor address bus, the input/output bus, and the external address bus, respectively, to the global address bus. The microprocessor generates a first bus request signal to attempt to access the global memory. The first bus request signal is input to an arbitration network. The arbitration network generates a first bus grant signal if the global memory is not being accessed by the input/output controller, and a global access control circuit generates a first ready signal which is conducted on a first conductor to the microprocessor, which then generates a first enable signal and a first write signal to effectuate accessing of the global memory by the first processor. The input/output controller generates a second bus request signal if it wishes to access the global memory. The arbitration network responds to the second bus request by generating a second bus grant signal if the global memory is not presently being accessed by the microprocessor. The global access control circuit generates a second ready signal on a second conductor and conducts it to the input/output controller, which generates a second enable signal and a second write signal to effectuate accessing of the global memory by the input/output controller. If the external bus requests access to the global memory, an address produced by the external bus is decoded to generate a third bus request signal in synchronization with any ongoing accessing of the global memory by the microprocessor or the I/O controller. If the microprocessor is accessing the global memory, the third bus request signal causes the global access control circuit to generate a first wait signal on the first conductor in synchronization with accessing of the global memory by the microprocessor, causing the microprocessor to cease generating the first enable signal and the first write signal, and causes a third enable signal and a third write signal to be generated to effectuate interleaving of access cycles by the external processor to the global memory with the accessing of the global memory by the microprocessor. The global access control circuit generates a second wait signal on the second conductor in synchronization with accessing of the global memory by the input/output controller, causing the input/output controller to stop producing the second enable signal and the second write signal. The global access control circuit then generates the third enable signal and the third write signal to effectuate interleaving of access cycles by the external processor to the global memory with the accessing of the global memory by the input/output controller.

BRIEF DESCRIPTION OF THE DRAWINGS

FIG. 1 is a block diagram of a digital signal processor embodying the present invention.

FIG. 5 is a detailed block diagram of the arbitration network block of FIG. 2.

DESCRIPTION OF THE INVENTION

Figure 3:
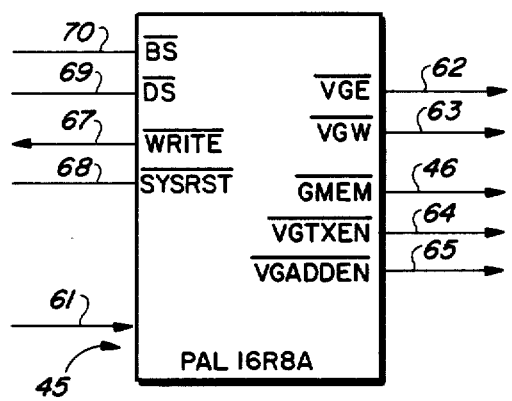
FIG. 3 is a block diagram useful in explaining the global RAM timing PAL of FIG. 2.
Figure 4:
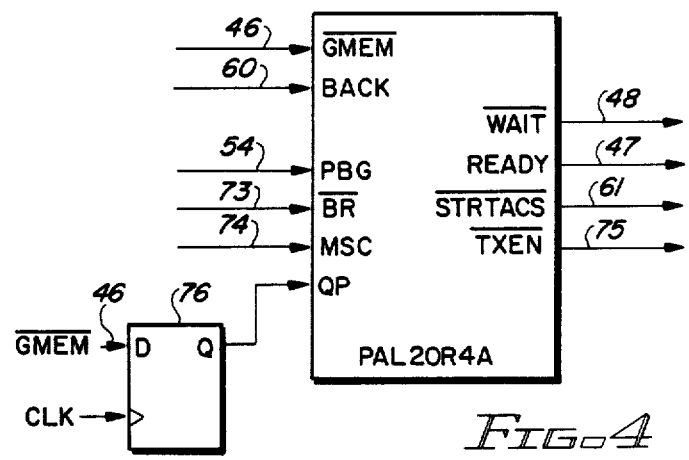
FIG. 4 is a block diagram useful in describing the global RAM access PAL of FIG. 2.

Referring now to the drawings, particularly FIG. 1, the digital signal processor 1 includes a VME bus 2. Those skilled in the art know that the VME bus structure is widely used. It includes 16 data bus conductors, 23 address bus conductors, and various strobe signals. VME bus 2 is connected to an external processor 2A.

In accordance with the present invention, the digital signal processor of FIG. 1 is selectively coupled to VME bus 2 by means of VME data bus transceiver 4, which couples the data conductors of VME bus 2 to a "local VME data bus" 5. VME data bus transceiver 4 can include several standard buffer chips, such as SN74F245's, manufactured by Fairchild for the D0–D15 VME data bus conductors. The conductors of local VME data bus 5 are selectively coupled by transceiver 6 (which can be a pair of 74HCT245 integrated circuits, manufactured by RCA) and conductors 7 to corresponding data bus conductors of microprocessor data bus 8. The conductors of local VME data bus 5 also are selectively coupled by transceiver 21 (which can be a pair of RCA 74HCT245 integrated circuits) to global data bus 19. The 16 conductors of global data bus 19 are selectively coupled by transceiver 18 to the 16 conductors of microprocessor data bus 8.

The 16 conductors of global data bus 19 also are selectively coupled by transceiver 22 (which can be a pair of 74HCT245 integrated circuits) to I/O controller bus 35, which includes 16 data/address conductors, and three control conductors, namely DS (data strobe), AS (address strobe), and R/W* (read-write). (It should be noted herein that variable names followed by an asterisk represent logical complements, as the printer being used by applicant does not have an overstrike capability.)

The global data bus conductors 19 are connected to the data terminals of global RAM 20, which can include 32,768 (i.e., 32K) words of 16 bits each. Global RAM 20 includes eight NEC 4362 16K×4 static RAM integrated circuits. The address inputs of global RAM 20 are connected to the 14 conductors of global address bus 37. Global address bus 37 is selectively coupled by buffer 36 (which can include an 74F244 integrated circuit buffer and an AM29827 20 bit buffer manufactured by AMD (Advanced Micro Devices) to microprocessor address bus 34, which includes 16 address conductors. Global address bus 37 also is selectively coupled by buffer 39 (which can include two 74HCT374 integrated circuits) to the 14 conductors of I/O controller bus 23. Global address bus conductors 37 are also selectively coupled by buffer 38 (which can include an AM29827 integrated circuit and an 74HCT244 integrated circuit) to "local" VME address bus 32. Local VME address bus 32 is selectively coupled by buffer 33 (which can include an AM29827 integrated circuit buffer and an HCT244 integrated circuit) to the microprocessor address bus 34. Local VME address bus 32 also is coupled by VME address decoder and control circuitry 30 (which includes several standard buffers, including an AM29821 and an 74ALS244 and an 74LS682) to the 16 address conductors of VME bus 2.

Some of the control circuitry in block 30 generates a plurality of various board control circuits generally designated by reference numeral 16 to represent various clock, chip select, and timing signals that can be routinely provided by one skilled in the art, some of which are subsequently described with reference to FIG. 2.

VME bus 2 also is coupled to interrupt circuitry 29A, which is not the subject of the present invention, but is included in FIG. 1 for completeness.

Digital processor 1 includes a 16 bit high speed microprocessor 9, which can be a Texas Instruments TMS32020 "limited instruction set" microprocessor. The 16 address outputs A0–A15 of microprocessor 9 are connected to microprocessor address bus 34. The data terminals D0–D15 of microprocessor 9 are connected to corresponding conductors of microprocessor data bus 8.

The function of the TMS32020 microprocessor 9 is defined by its instruction set, which is stored in its program memory. The TMS32020 is capable of executing code from an EPROM monitor 11, bipolar programmable read-only memory 12, or external program RAM 13. Programs to be executed by microprocessor 9 can be downloaded from RAM 13 or monitor 11 via the VME bus 2 for execution by microprocessor 9. Microprocessor 9 includes an internal data RAM that can be accessed internally by microprocessor 9 at any time.

Microprocessor 9 will wait for a READY signal before going ahead with any accessing of global RAM 20, as subsequently explained. Microprocessor 9 executes an SXF (set external flag) instruction to request access to the global RAM 20, and when it has completed the requested accessing, it releases the global data and address buses by executing an RXF (release external flag) instruction.

"Local" RAM 10 (which can include eight NEC 4362 static RAM chips) is coupled between microprocessor address bus 34 and microprocessor data bus 8. Electrically programmable read-only memory (EPROM) 11, which also is coupled between microprocessor address bus 34 and microprocessor data bus 8, contains a software monitor that is the subject of a copending patent application entitled "METHOD AND APPARATUS FOR PROVIDING AND HANDLING BREAK POINTS IN A SOFTWARE MONITOR", by Iain Haswell-Smith, commonly assigned, filed on even date herewith, and incorporated herein by reference for completeness of disclosure.

Bipolar programmable read-only memory (PROM) 12 (which can include a pair of MB7144/2 PROMs manufactured by Fujitsu) also is coupled between microprocessor address bus 34 and microprocessor data bus 8. Additional program memory 13 on a separate board also can be coupled between microprocessor address bus 34 and microprocessor data bus 8. Access to the digital signal processor 1 by an external terminal can be achieved by an RS232C terminal port 15. A host computer can access the digital signal processor 1 via an RS232C host port 14. Port selection can be accomplished by block 35, which decodes certain conductors of microprocessor address bus 34.

High speed output of blocks of data from digital signal processor 1 can be effectuated by an output port FIFO (first in, first out) buffer 27, which is coupled to I/O controller bus 23. FIFO buffer 27 can include a pair of IDT7201 integrated circuits by Integrated Device Technology. A high speed input port 28 also is connected to I/O controller bus 23. Input port circuit 28 can include a pair of 74F374 integrated circuit latches manufactured by Fairchild. An I/O controller 26, which can be a UDC9516 DMA controller chip manufactured by AMD, is coupled to I/O controller bus 23. A transceiver 25 selectively couples microprocessor data bus 8 to the data conductors of I/O controller bus 23. The function of the I/O controller 26 is to transfer blocks of data between global RAM 20 and the high speed input and output ports 27 and 28. This data transfer can be executed independently of the microprocessor 9 executing and using its internal local data memory.

I/O controller 26 is programmed by means of a series of internal registers, only two of which need to be programmed by microprocessor 9 via its ports D and E, namely its master mode register (MMR) and the chain address register (CAR) of each channel. A table is set up in the global RAM 20 for each controller channel and is loaded from global RAM 20 by the I/O port controller 26 when commanded to do so by microprocessor 9.

In accordance with the present invention, VME bus 2 can access global data memory 20 at any time. This is accomplished by inserting wait states into any ongoing accessing of global RAM 20 by microprocessor 9 or I/O controller 26 in order to "interleave" the VME bus access to global RAM 20 with such ongoing access thereto by microprocessor 9 or I/O controller 26. Both microprocessor 9 and I/O controller 26 have hardware request inputs which, when granted, allow them access to global memory 20. When such access is granted by the arbitration network 53 of FIG. 2 to microprocessor 9 to or I/O port controller 26, all resulting accesses to global memory 20 proceed with "zero" wait states, unless wait states occur as a result of a global memory access via VME bus 2 by external processor 2A.

Figure 2:
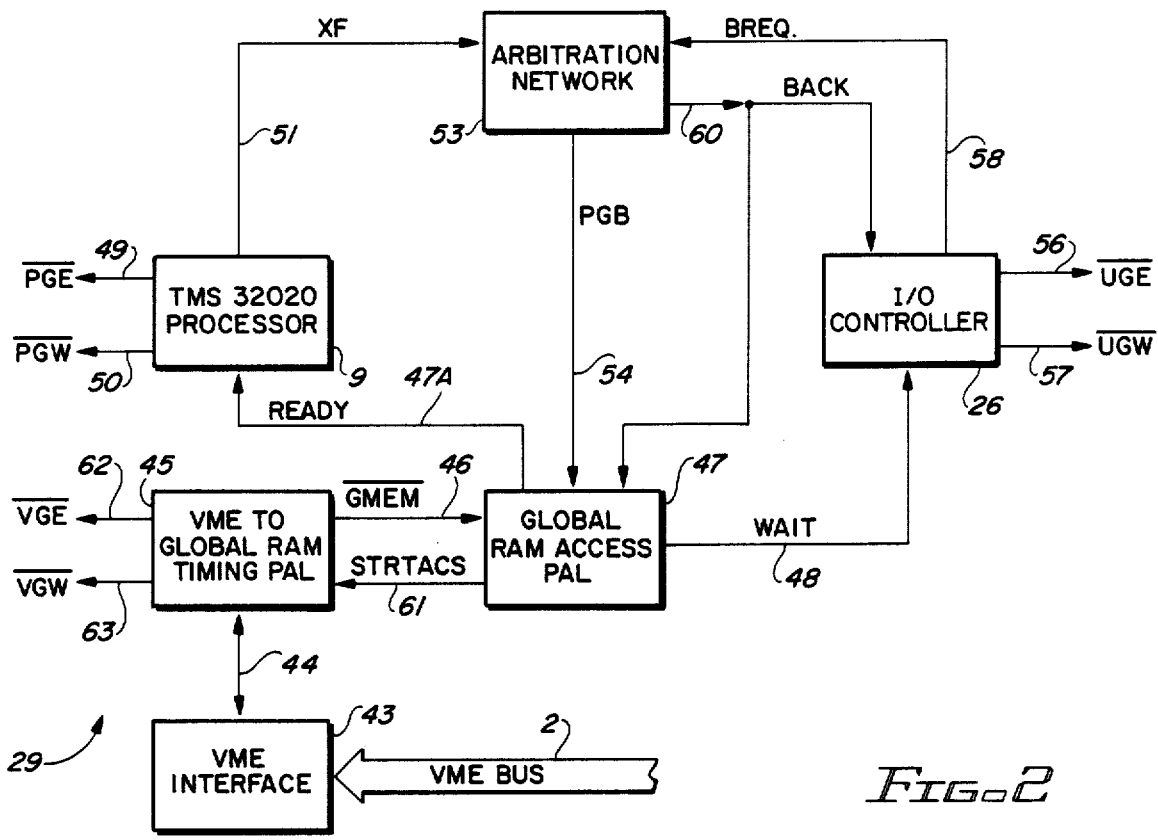
FIG. 2 is a block diagram of arbitration circuitry that effectuates the interleaved access to the global RAM of FIG. 1 by the VME bus therein.
Figure 3:
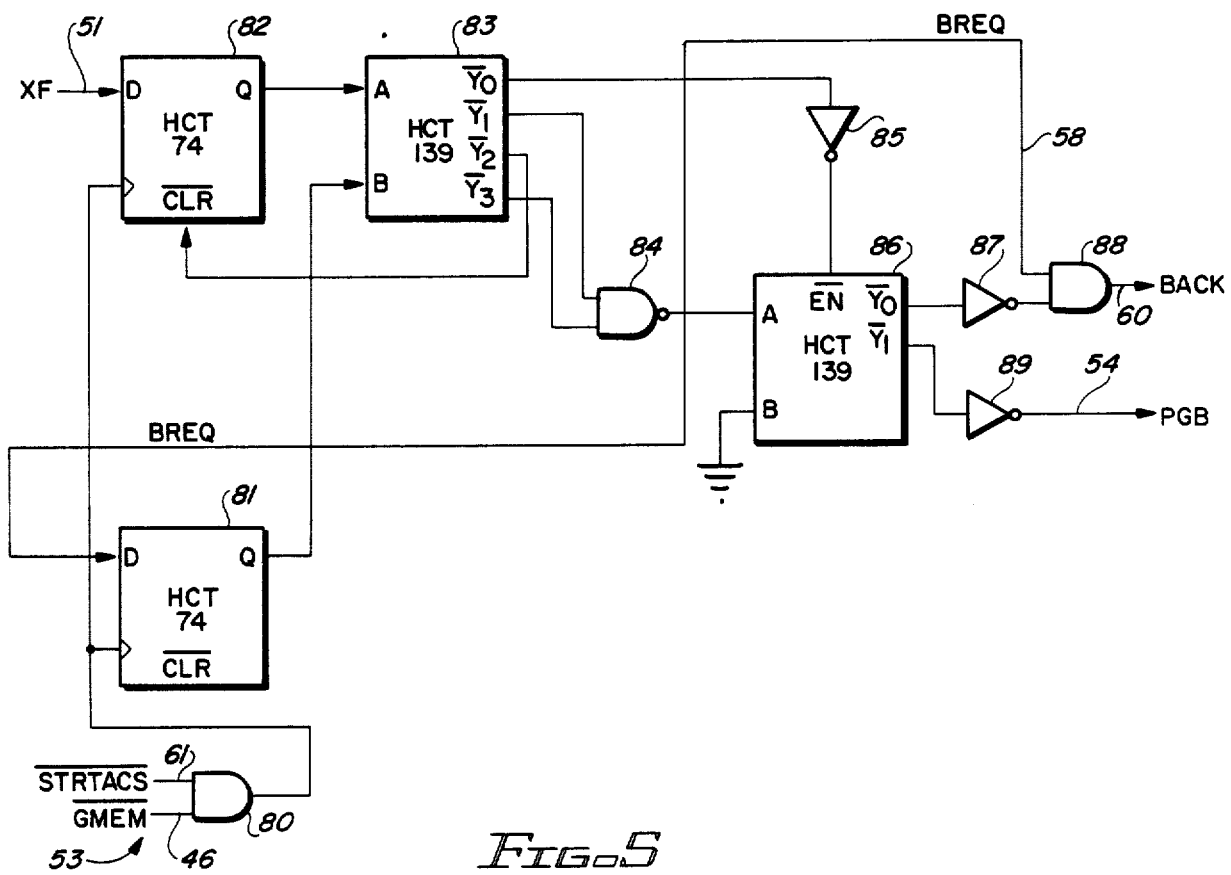

Referring next to FIG. 2, reference numeral 29 designates control and bus arbitration circuitry included in the system of FIG. 1 (but not shown in the block diagram thereof) to effectuate the "interleaved" access of global RAM 20 by VME bus 2 when microprocessor 9 or I/O bus controller 55 is accessing global RAM 20. The circuitry of FIG. 2 also effectuates access of global RAM 20 by microprocessor 9 or I/O bus controller 55 when VME bus 2 is not accessing global RAM 20. Bus arbitration and control circuitry 29 includes a VME interface circuit 43 contained within block 30 of FIG. 1, connecting the BS (board select), DS (data select), A16, A17 and WRITE conductors of VME bus 2 via conductors 44 to VME to global RAM timing PAL (programmed array logic) circuit 45. Conductors 44 carry the BS*, A16 and A17 and DS* signals, indicating a request by VME bus 2 to access global RAM 20, which has absolute priority to access global RAM 20. Several of the conductors of the VME address bus, namely BS*, A16, A17 and DS*, are decoded to generate the bus request signal.

Global RAM timing PAL 45, hereinafter referred to as "timing PAL 45", can be a Monolithic Memories PAL 168R8A programmed array logic chip, the inputs and outputs of which are shown in more detail in FIG. 3. Appendix A attached hereto indicates how global RAM timing PAL 45 is programmed to effectuate the operation of the present invention. A signal called DTACK* (data acknowledge) is transmitted from timing PAL 45 to VME bus 2 via conductors 44. When DTACK* is active it means that data has been written into the digital signal board or data is ready to be read from it by the VME bus.

Global RAM timing PAL 45 produces a GMEM* (global memory) signal on conductor 46. GMEM* is produced in response to the above-mentioned VME bus request carried by conductors 44, and is provided as an input to global RAM access PAL 47, which can be a Monolithic Memories PAL 20R4A programmed array logic chip. Appendix B shows how global RAM access PAL 47 is programmed in accordance with the present invention.

Figure 6:
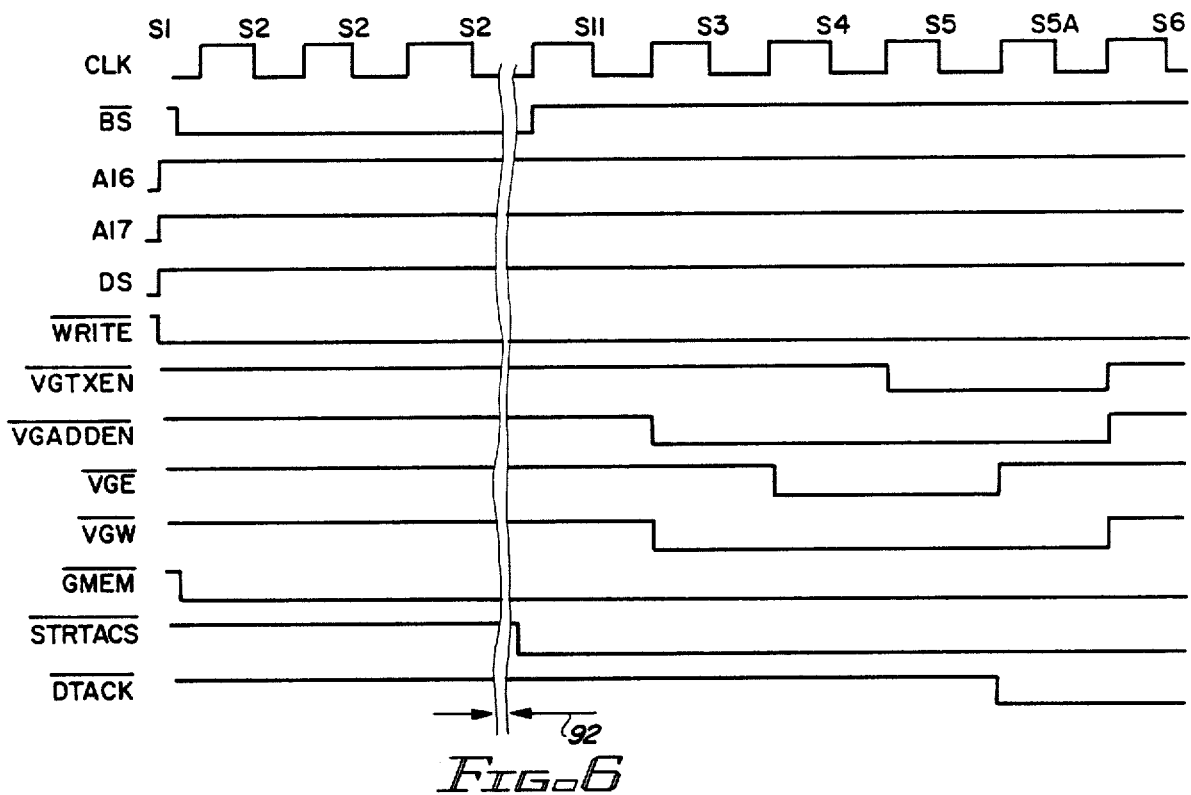
FIG. 6 is a timing diagram of a VME bus global memory write cycle for the system of FIG. 1.
Figure 7:
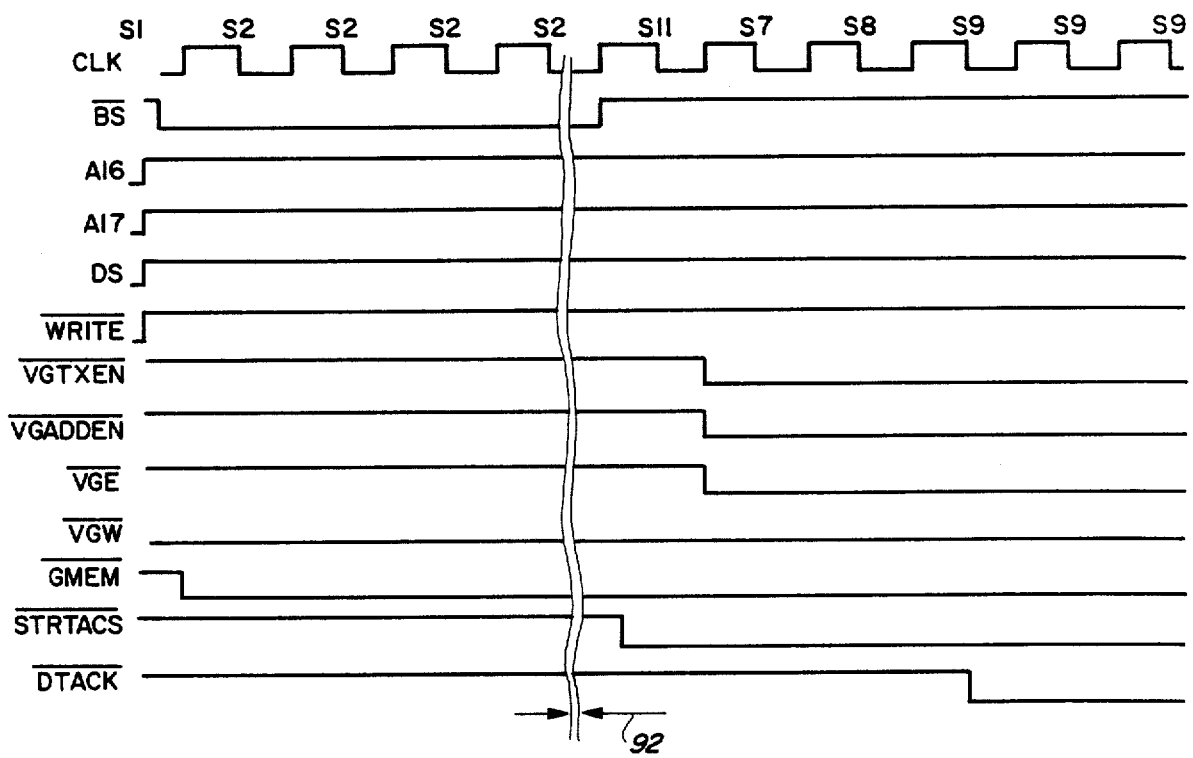
FIG. 7 is a timing diagram of a VME bus global memory read cycle for the system of FIG. 1.

The GMEM* signal received by global access PAL 47 either produces wait states to be impressed on the READY conductor 47A or WAIT conductor 48 during each memory cycle, illustrated in the timing diagrams of FIGS. 6 and 7.

An active READY signal is produced on conductor 47A by global access PAL 47 if a PGB (processor granted bus) signal on conductor 54 is at an active level, meaning that microprocessor 9 is accessing global RAM 20. An inactive WAIT signal is produced on conductor 48 by global RAM access PAL 47 if a BACK (I/O controller bus acknowledge) signal on conductor 60 is at an active level, indicating that I/O controller 26 presently is accessing global RAM 20. An active level of the READY signal causes microprocessor 9 to halt operations during the present cycle and an inactive level of the WAIT signal causes I/O port controller 26 to halt its operation during the present cycle.

The bus arbitration and control network of FIG. 2 grants a global RAM access request from microprocessor 9 or I/O controller 26 to the one first making such request. Only when a granted global RAM access request becomes inactive can the other one of them gain control of the global address and data buses.

If microprocessor 9 wants to request access to global RAM 20, it sets the XF flag signal to an active level by executing an SXF "set external flag" instruction. This bus request results in the arbitration network 53 in FIG. 2 granting access to microprocessor 9 if the global address and data buses are not being used by I/O controller 26, in which case PBG is set to its active level and is applied as an input to global access PAL 47, which causes the READY signal on conductor 47 to be set to its active level. This causes the proper levels of PGE* and PGW* to be generated to enable buffer 36 and transceiver 18 to couple microprocessor address bus 34 to global address bus 37 and couple microprocessor data bus 8 to global data bus 19. PGE* and PGW* are buffered into the global RAM. When a "micro wait" state is in progress, the buffers switch away the PGE* and PGW* signals to allows addresses and data to come from the VME bus source.

The global access PAL 47 is programmed to control the number of wait states thus inserted in the program memory of microprocessor 9. Insertion of a wait state into the TMS32020 simply "stops the microprocessor in its tracks", i.e., immediately halts all internal activity by microprocessor 9. The PGE* and PGW* signals remain at the buffer and transceiver inputs. READY is sampled once by microprocessor 9 during each cycle. If READY is still low, then microprocessor 9 will sample it again next cycle.

Thus, READY and the wait state inserted thereby only stops microprocessor 9 if the VME bus wants to access the global RAM 20.

Similarly, if I/O controller 26 wants to request access to global RAM 20, it generates the BREQ signal on conductor 58. This bus request results in arbitration network 53 of FIG. 2 granting access to I/O port controller 26 if the global address and data buses are not being used by microprocessor 9, in which case BACK (bus acknowledge) is set to its active level and applied as an input to the global access PAL 47. This causes the WAIT signal on conductor 48 to assume an inactive level, which in turn causes I/O controller 26 to generate the UGE* and UGW* signals that enable buffer 39 and transceiver 22 to couple I/O controller bus 23 to the global address bus 37 and global data bus 19, respectively.

When VME bus 2 makes a request for access to global RAM 20, timing PAL 45 causes GMEM* to become active, representing a VME global RAM bus request input to memory access PAL 47.

When the VME request signal GMEM* has been synchronized to the microprocessor 9 or I/O port controller 26 processor already accessing the global RAM as illustrated in the timing diagrams of FIGS. 6 and 7, the start access signal STRTACS goes active, as also shown in FIGS. 6 and 7. This signal directly controls the buffer 38 and transceiver 21 coupling the local VME address and data buses to the global address bus and global data bus, respectively.

Wait states are inserted by the global RAM access PAL 47 into microprocessor 9 or I/O controller 26 only if one of them is trying to access global RAM 20 while the VME bus 2 is accessing it. Any change in access granted to microprocessor 9 or I/O controller 26 by arbitration network 53 while a particular VME access is occurring is suspended until that VME access is ended.

Global RAM access PAL 47 is programmed to generate the above-described wait states on the READY conductor 47A or the WAIT conductor 48 and then generate an active level of the STRTACS (start access) signal on conductor 61. The STRTACS signal on conductor 61 is applied as an input to global RAM timing PAl 45, causing it to generate an enable signal VGE* on conductor 62 and a write signal VGW* on conductor 63, as shown in the timing diagrams of FIGS. 6 and 7, to selectively enable transceiver 21 and buffer 38 so that the VME bus can access and performs read or write operations on global RAM 20 via global address bus 37 and global data bus 19.

Also, transceiver 6 and buffer 33 are disabled at that same time, isolating processor data bus 8 and processor address bus 34 from VME bus 2.

The details of arbitration network 53 in FIG. 2 are shown in the circuit of FIG. 5, which includes a two input AND gate 80 that receives the STRTACS* signal on input 61 and the GMEM* signal on conductor 46. A third input, not shown, is a 5 megahertz clock signal generated by the TMS32020. The output of AND gate 80 is connected to the clock inputs of two D-type flip-flops 81 and 82 (which can be HCT74's). Flip-flop 81 receives the BREQ (I/O port controller bus request) signal on conductor 58 at its D input and produces its Q output signal, which is applied to the B input of a decoder 83, which is a 2 to four decoder. The D input of flip-flop 82 receives the XF (microprocessor bus request) signal on conductor 51, and produces a Q output that is applied to the A input of decoder 83. The Y0* output of decoder 83 is inverted by inverter 85 and applied to an enable input of another decoder 86. The A input of decoder 86 is connected to the output of a two input NAND gate 84, which receives the Y1* and Y3* outputs of conductor 84. The Y2* output of decoder 83 is connected to the clear input of flip-flop 82.

The Y0* output of decoder 86 is inverted by inverter 87 and applied to one input of a two input AND gate 88, the other input of which receives the BREQ signal on conductor 58. Two input AND gate 88 produces the BACK (bus acknowledge) signal on conductor 60. The Y1* output of decoder 86 is inverted by inverter 89, which produces the PGB signal on conductor 54.

It should be noted that the BACK and PBG signals can be thought of as "resource available" flags. Typically, only one such resource available flag is generated by a resource (such as global RAM 20) that is commonly accessable by a number of different possible requesting circuits, such as microprocessor 9 and I/O controller 26. If only one resource available flag exists, then each requesting device must "look" at the single resource available flag, request access to the resource, and then "look" again at the single resource available flag to see if the requesting circuit successfully obtained the access to the resource. However, the arbitration system shown in FIG. 5 provides two resource available flags, namely BACK and PGB. Therefore, microprocessor 9 and I/O controller 26 each only need to request access to the global RAM 20 and respond to its own resource available flag, namely BACK or PGB. This reduces the software requirement for microprocessor 9 and I/O port controller 26, and increases the system speed.

Thus, access to global RAM 20 is arbitrated between the I/O controller bus input and output ports and microprocesor 9. Once access to the global address and data buses have been granted to either, the data transfers proceed at full speed until the global bus request is removed. The microprocessor bus request is set by a software instruction and the I/O controller bus request is set by a command from the microprocessor 9 and software contained in the I/O controller 26. The microprocessor 9 can read the status of the ports of the I/O controller 26 and determine when data is waiting to be transferred. Microprocessor 9 then can initiate the transfers and continue with its own internal task until it receives an interrupt from the I/O controller 26. This interrupt tells microprocessor 9 that a certain number of words have been transferred to global RAM 20 and are waiting to be processed. Thus, microprocessor 9 has complete control over global memory and access to it programmed in its software.

The VME bus 2 can access global RAM 20 at any time by using the above-described accessing technique whereby the global RAM bus request is synchronized to whatever other device (microprocessor 9 or I/O controller 26) is presently accessing global RAM 20 at that particular instant, and then "interleaves" in its own read or write cycle by inserting the synchronized wait states.

In some applications, most of the available time is spent by microprocessor 9 processing data; during such time global RAM 20 is available for access by I/O port controller 26 or VME bus 2. Therefore, all or nearly all desired input and output of data can be performed while microprocessor 9 is executing its internal programs, such as computing fast Fourier transforms or the like.

FIG. 6 is a detailed timing diagram for digital signal processor 1 for a microprocessor write cycle; FIG. 7 is a similar timing diagram for a microprocessor read cycle. In FIGS. 6 and 7, CLK is the 20 megahertz clock signal that is supplied as an input to the TMS32020 microprocessor 9. BS* is a board select signal generated by the VME interface PAL 43. BS* signals when the digital signal processor board 1 has been selected for a read/write operation by a system master (not shown) connected to the VME bus, i.e., when any other device connected to the VME bus attempts to access the digital signal processor 1.

The address bits on waveforms A16 and A17 are buffered from the VME bus 2. When A16 and A17 are both high, this condition is decoded to indicate that access to global RAM 20 is desired by the VME bus 2. The signal DS (data strobe) is a buffered data strobe signal. The WRITE* signal is low if a write operation is occurring or being initiated and is high if a read operation is occurring or being initiated.

The signal VGTXEN* is an output generated by timing PAL 45 that enables the transceivers 18, 21, and 22 that effectuate access to global RAM 20. VGADEN* is an output of timing PAL 45 that enables the global address buffers 36, 38, and 39, and also enables the VGE* and VGW* signals to global RAM 20.

VGE* is an output signal produced by timing PAL 45 that functions as a global RAM enable for the VME bus request. VGW* is a global write enable signal to the global RAM for the VME bus for a write cycle only. GMEM* is a bus request output produced by timing PAL 45 to global RAM access PAL 47, as previously explained. STRTACS* is the grant signal from global access PAL 47 and forming timing PAL 45 to go ahead with the VME bus access of the global RAM, as previously explained. The DTACK* waveform signals the VME bus that data has been written to the global RAM or that data is available for a read operation from the global RAM.

The time gap designated by arrows 92 in FIGS. 6 and 7 represent delays that have to be allowed between clock states S2 and S11 in order to synchronize access of global RAM 20 by VME bus 2 with any presently occurring access of global RAM 20 by microprocessor 9 or by input/output port controller 26.

If neither microprocessor 9 or I/O port controller 26 is presently accessing global RAM 20, then the time delay 92 should be 50 nanoseconds. Delay 92 is the amount of time that should be allowed before STRTACS goes active in order for the interleaved access by VME bus 2 to be properly interleaved with ongoing access by microprocessor 9 or I/O bus controller 26 in accordance with the present invention.

If microprocessor 9 presently is accessing global RAM 20, then delay 92 should be 200 nanoseconds, and if I/O port controller 26 is presently accessing global RAM 20, then delay 92 should be 500 nanoseconds.

Figure 8:
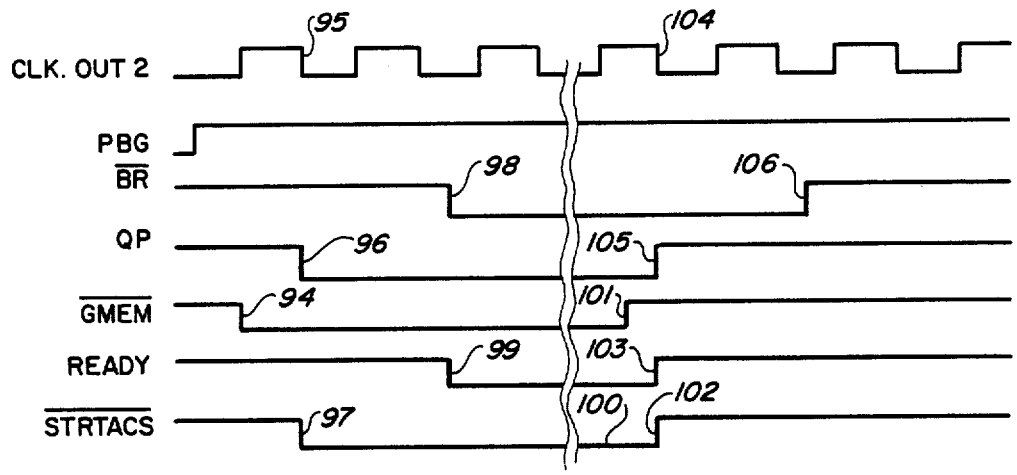
FIG. 8 is a timing diagram illustrating interleaving of global memory access cycles by the VME bus with global memory access cycles by the TMS32020 processor in FIG. 1.

The timing diagram of FIG. 8 illustrates the timing of an operation wherein VME bus 2 interleaves an operation of accessing global RAM 20 into an access of global RAM 20 by microprocessor 9. The waveform CLKOUT2 is the above-mentioned clock signal for the TMS32020. The fact that microprocessor 9 has control of the global address bus 37 and global data bus 19 is indicated by the fact that the PBG waveform is at a high level. As previously explained, the first thing that happens for access to global RAM 20 in response to a VME bus request is that GMEM* goes low, as indicated by reference numeral 94. This causes a waveform QP, which in essence is a synchronized version of GMEM* synchronized to CLKOUT2, to go low in synchronization with edge 95 of the CLKOUT2 waveform, as indicated by reference numeral 96. That is, the next negative-going edge of CLKOUT2 occurring after negative-going transition 94 of GMEM* produces transition 96 of the QP waveform. The occurrence of transition 96 of QP means that synchronization with any ongoing global RAM access being carried out by microprocessor 9 has been achieved, and the requested VME access can begin. The STRTACS* signal therefore is caused to undergo transition 97 in response to transition 96 of the QP waveform.

It should be noted that at the beginning of the sequence of signals shown in FIG. 8, if BR*, which is a bus request signal from microprocessor 9, goes low, it means that microprocessor 9 is attempting to access global RAM 20. Reference numeral 98 designates such an attempt by microprocessor 9 to access global RAM 20 while the VME bus access to global RAM 20 is occurring. When PGB is high, microprocessor 9 is free to attempt to access global RAM 20. In accordance with the present invention, the requested global RAM access by microprocessor 9 represented by transition 98 of BR* is not permitted. Instead, the READY waveform immediately undergoes a negative-going transition 99, thereby inserting a wait state into microprocessor 9.

Meanwhile, the VME access to global RAM 20 occurs during the time period when STRTACS* is at the low level designated by reference numeral 100. When the VME access is completed, as indicated by transition 101 of GMEM*, READY undergoes transition 103 and STRTACS* undergoes transition 102. The next negative-going transition 104 of CLKOUT2 then causes a synchronized corresponding transition 105 of QP, which allows the global RAM access requested by microprocessor 9 (as evidenced by transition 98 of BR*) to begin. The access of global RAM 20 by microprocessor 9 then continues until it is completed, as indicated by transition 106 (unless, of course, there is another VME bus request for access to global RAM 20.)

Figure 9:
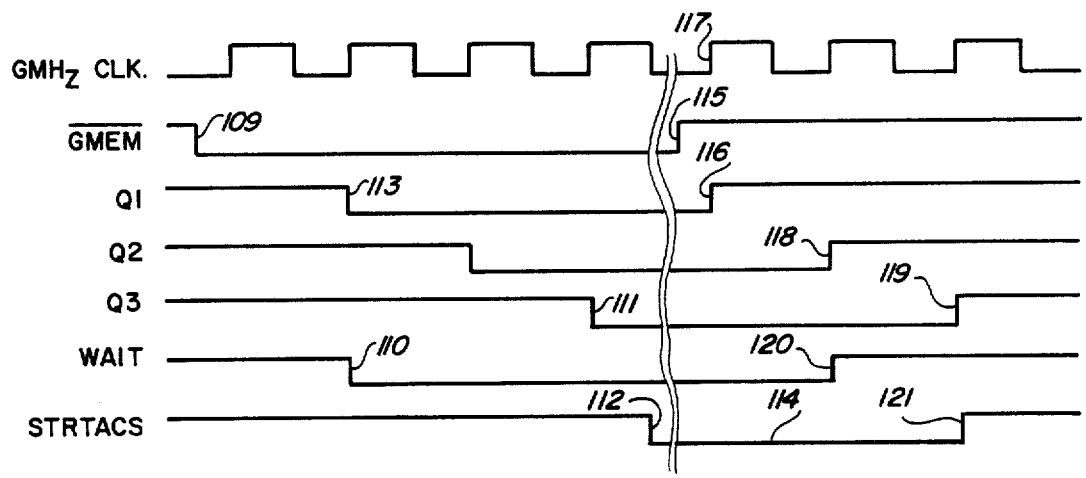
FIG. 9 is a timing diagram illustrating interleaving of global memory access cycles by the VME bus with global memory access cycles by the input/output controller in FIG. 1.

FIG. 9 illustrates the timing of the main signals that are utilized to interleave a VME global RAM access request by the VME bus into an access of the global RAM 20 by the I/O controller 26. The 6 MHz CLK signal is a clock signal produced by the I/O controller circuit 26. The waveforms GMEM*, Q1, Q2, and Q3 are timing signals generated by a counter in response to a global RAM bus request signal from the VME bus, as previously explained. In response to the initial VME bus request for access to global RAM 20, GMEM* undergoes negative-going transition 109. Approximately two further 6 MHz clock signal cycles must be allowed to occur before the WAIT signal is generated. The counter that generates Q1, Q2, and Q3 produces the necessary timing signals to ensure that STRTACS does not undergo a negative-going transition too soon after WAIT undergoes negative-going transition 110, as the I/O port controller 26 does not "look at" WAIT every 6 MHz cycle. By waiting until Q3 undergoes transition 111 and enabling transition 112 of STRTACS at that time, it can be ensured that the requested VME bus access of global RAM 20 does not begin too soon and is effectively synchronized with any ongoing access of global RAM 20 by I/O controller 26.

To summarize the operation shown in FIG. 9, transition 109 of GMEM* starts the counter Q1, Q2, and Q3. Transition 111 of Q3 occurs three of the 6 MHz CLK cycles after transition 113 of waveform Q1. The VME bus access of global RAM 20 continues while STRTACS is at the low level designated by reference numeral 114. When GMEM* undergoes positive-going transition 115, the requested access of global RAM 20 by VME bus 2 is complete. This restarts the counter, which causes Q1 to undergo transition 116. Q2 follows at 116, which is synchronized to edge 117 of the 6 MHz CLK signal. Transition 118 of Q2 and transition 119 of Q3 follow. The transition 120 of WAIT is synchronized with transition 118 of Q2, and transition 121 of STRTACS is synchronized with transition 119 of Q3. The DMA controller which is utilized to implement I/O port controller 26 continues its access of global RAM 20 in synchronization with transition 120 of WAIT.

The above-described system solves some of the shortcomings of the prior SPV100 digital processing circuit by requiring only one-half of the amount of RAM, since global RAM 20 can be used both as data memory and as I/O memory. Furthermore, the fact that global RAM 20 is accessable by both the VME bus 2 and microprocessor 9 results in additional flexibility and operating speed. The invention makes it very convenient and easy to write programs that accomplish efficient message-passing between the VME bus 2 and the microprocessor 9, using the global RAM 20. The fact that three different processors, namely the TMS32020, any processor connected to the VME bus, and the input/output controller do not need to separately monitor three separate memory areas to execute three different processes, and instead all can monitor and access the single global RAM, greatly decreases the difficulty of the programming needed to execute the three different processes or programs. In short, the invention provides much greater flexibility to the programmer needing to cause separate processors to execute separate processes in the same system.

While the invention has been described with respect to a number of embodiments, those skilled in the art will be able to make various modifications to the described embodiment without departing from the true spirit and scope of the invention. It is intended that all techniques which are equivalent to those described herein in that they perform substantially the same function in substantially the same way to achieve the same result are within the scope of the invention.

APPENDIX A

```
module PAL3
title 'Global memory interface from the VMEbus
Michael Smith  COPYRIGHT 1986 BURR-BROWN LTD   24:06:86   REV 1.0'

"This device provides the neccesary interface signals for accessing the global
"memory for both read and write from the VMEbus. The signal /GMEM is a request
"line for access and the /STRTACS a grant line. PAL5 issues the /STRTACS -
"start access signal at the correct times. The VMEbus makes the 32020 and 75ls
"wait for global access.
"VGTXEN enables the data transceivers.
"VGADDEN enables the address buffers.
"VGE is the global ram chip enable from the VME side.
"VGW is the global ram write enable from the VME side.
"DTACK drives the VME bus.
        IC52       device 'P16R8';

clk,BS,DS,MC2,WRITE,SYSRESET,A17,A16,STRTACS pin 1,2,3,4,5,6,7,8,9;
    OE,Q1,Q0,GMEM,DTACK,VGW,VGE,VGADDEN,VGTXEN pin 11,12,13,14,15,16,17,18,19;

Ck,X,Z = .C.,.X.,.Z.;

OUTPUTS = [VGTXEN,VGADDEN,VGE,VGW,DTACK,GMEM,Q0];

"OUTPUT STATES [OUTPUTS]
        S1  = ^b1111111;
        S2  = ^b1111100;
        S11 = ^b1111101;
        S3  = ^b1010101;
        S4  = ^b1000101;
        S5  = ^b0000101;
        S5A = ^b0010001;
        S6  = ^b1111001;
        S7  = ^b0001101;
        S8  = ^b0001100;
        S9  = ^b0001001;
        S10 = /S1#/S2#/S3#/S4#/S5#/S5A#/S6#/S7#/S8#/S9#/S11;
``` state_diagram OUTPUTS

```
STATE  S10: GOTO S1;

STATE  S1:  IF (SYSRESET & /BS & A16 & A17 & /DS ) THEN S2
                                                 ELSE S1;

STATE  S2:  IF (SYSRESET & /STRTACS) THEN S11
            ELSE
            IF /SYSRESET THEN S1
            ELSE S2;

STATE  S11: IF (SYSRESET & /WRITE) THEN S3
            ELSE
            IF (SYSRESET & WRITE) THEN S7
            ELSE S1;

STATE  S3:  IF SYSRESET THEN S4
                         ELSE S1;

STATE  S4:  IF SYSRESET THEN S5
                         ELSE S1;

STATE  S5:  IF SYSRESET THEN S5A
                         ELSE S1;

STATE  S5A: IF SYSRESET THEN S6
                         ELSE S1;

STATE  S6:  IF (/SYSRESET # DS ) THEN S1
                                 ELSE S6;

STATE  S7:  IF SYSRESET THEN S8
                         ELSE S1;

STATE  S8:  IF SYSRESET THEN S9
                         ELSE S1;

STATE  S9:  IF (/SYSRESET # DS ) THEN S1
                                 ELSE S9;
``` test_vectors 'test the state machine'

```
  ([clk,SYSRESET,BS,A16,A17,DS,WRITE,STRTACS,OE] -> OUTPUTS)
   [Ck ,  0   ,X , X , X , X,  X ,   X    , 0] -> S1;
   [Ck ,  1   ,1 , X , X , X,  X ,   X    , 0] -> S1; "idle
   [Ck ,  1   ,0 , 1 , 1 , 0,  X ,   1    , 0] -> S2; "request gmem
   [Ck ,  1   ,X , X , X , X,  X ,   1    , 0] -> S2; "wait for it
   [Ck ,  1   ,X , X , X , X,  X ,   0    , 0] -> S11; "delay state
   [Ck ,  1   ,X , X , X , X,  0 ,   X    , 0] -> S3; "granted & 1st w
   [Ck ,  1   ,X , X , X , X,  X ,   X    , 0] -> S4; "2nd write
   [Ck ,  1   ,X , X , X , X,  X ,   X    , 0] -> S5; "drive DTACK
   [Ck ,  1   ,X , X , X , X,  X ,   X    , 0] -> S5A; "drive DTACK
   [Ck ,  1   ,X , X , X , 0,  X ,   X    , 0] -> S6; "wait for end
   [Ck ,  1   ,X , X , X , 1,  X ,   X    , 0] -> S1; "end of cycle
   [Ck ,  1   ,1 , X , X , X,  X ,   X    , 0] -> S1; "idle
   [Ck ,  1   ,0 , 1 , 1 , 0,  X ,   1    , 0] -> S2; "request gmem
   [Ck ,  1   ,X , X , X , X,  X ,   1    , 0] -> S2; "wait for it
   [Ck ,  1   ,X , X , X , X,  X ,   0    , 0] -> S11; "delay state
   [Ck ,  1   ,X , X , X , X,  1 ,   X    , 0] -> S7; "granted & 1st r
   [Ck ,  1   ,X , X , X , X,  X ,   X    , 0] -> S8; "2nd read cycle
   [Ck ,  1   ,X , X , X , X,  X ,   X    , 0] -> S9; "drive DTACK
   [Ck ,  1   ,X , X , X , 0,  X ,   X    , 0] -> S9; "wait for end
   [Ck ,  1   ,X , X , X , 1,  X ,   X    , 0] -> S1; "end of cycle
   [Ck ,  1   ,0 , 1 , 1 , 0,  X ,   X    , 0] -> S2; "request gmem
   [Ck ,  0   ,X , X , X , X,  X ,   X    , 0] -> S1; "sysreset
   [Ck ,  1   ,X , X , X , X,  X ,   X    , 1] -> [Z,Z,Z,Z,Z,Z,Z];
``` end PAL3

```
ABEL(tm) Version 1.13  -  Document Generator                    Page 1
                                                        25-Aug-86 07:55 AM
Global memory interface from the VMEbus
Michael Smith  COPYRIGHT 1986 BURR-BROWN LTD  24:06:86  REV 1.0
Equations for Module PAL3

Device IC52

Reduced Equations:

VGTXEN := /((DTACK & /GMEM & SYSRESET & /VGADDEN & /VGE & /VGTXEN
                 & VGW
               # DTACK & /GMEM & Q0 & SYSRESET & /VGADDEN & /VGE & /VGW

# /DS & /GMEM & Q0 & SYSRESET & /VGADDEN & /VGE &
                 /VGTXEN & VGW
               # DTACK & /GMEM & Q0 & SYSRESET & VGADDEN & VGE & VGTXEN
                 & VGW & WRITE);

VGADDEN := /((DTACK & /GMEM & Q0 & SYSRESET & /VGADDEN & /VGE &
                  /VGW
                # DTACK & /GMEM & SYSRESET & /VGADDEN & /VGE & /VGTXEN
                  & VGW
                # DTACK & /GMEM & Q0 & SYSRESET & /VGADDEN & VGTXEN &
                  /VGW
                # /DS & /GMEM & Q0 & SYSRESET & /VGADDEN & /VGE &
                  /VGTXEN & VGW
                # DTACK & /GMEM & Q0 & SYSRESET & VGADDEN & VGE &
                  VGTXEN & VGW);

VGE := /((DTACK & /GMEM & SYSRESET & /VGADDEN & /VGE & /VGTXEN &
                VGW
              # DTACK & /GMEM & Q0 & SYSRESET & /VGADDEN & VGTXEN & /VGW

# /DS & /GMEM & Q0 & SYSRESET & /VGADDEN & /VGE & /VGTXEN &
                VGW
              # DTACK & /GMEM & Q0 & SYSRESET & VGADDEN & VGE & VGTXEN &
                VGW & WRITE);

VGW := /((DTACK & /GMEM & Q0 & SYSRESET & /VGADDEN & /VGE & /VGW
              # DTACK & /GMEM & Q0 & SYSRESET & /VGADDEN & VGTXEN & /VGW

# DTACK & /GMEM & Q0 & SYSRESET & VGADDEN & VGE & VGTXEN &
                VGW & /WRITE);

DTACK := /((/DTACK & /GMEM & Q0 & SYSRESET & /VGADDEN & VGE &
                  /VGTXEN & /VGW
                # DTACK & /GMEM & /Q0 & SYSRESET & /VGADDEN & /VGE &
                  /VGTXEN & VGW
                # DTACK & /GMEM & Q0 & SYSRESET & /VGADDEN & /VGE &
                  /VGTXEN & /VGW
                # /DS & /DTACK & /GMEM & Q0 & SYSRESET & /VGADDEN & /VGE
                  & /VGTXEN & VGW
                # /DS & /DTACK & /GMEM & Q0 & SYSRESET & VGADDEN & VGE &
                  VGTXEN & VGW);

GMEM := /((/DTACK & /GMEM & Q0 & SYSRESET & /VGADDEN & VGE &
                 /VGTXEN & /VGW
               # DTACK & /GMEM & Q0 & SYSRESET & /VGADDEN & /VGE & /VGW
               # DTACK & /GMEM & SYSRESET & /VGADDEN & /VGE & /VGTXEN &
                 VGW
               # DTACK & /GMEM & Q0 & SYSRESET & /VGADDEN & VGTXEN & /VGW

# /DS & /GMEM & Q0 & SYSRESET & /VGADDEN & /VGE & /VGTXEN
                 & VGW
               # /DS & /GMEM & Q0 & SYSRESET & VGADDEN & VGE & VGTXEN &
                 VGW
               # DTACK & /GMEM & SYSRESET & VGADDEN & VGE & VGTXEN & VGW

# A16 & A17 & /BS & /DS & DTACK & Q0 & SYSRESET & VGADDEN
                 & VGE & VGTXEN & VGW);
```

```
Q0 := /DTACK & /GMEM & /Q0 & SYSRESET & /VGADDEN & /VGE &  /VGTXEN
    & VGW
  # DTACK & /GMEM & /Q0 & STRTACS & SYSRESET & VGADDEN & /VGE &
    VGTXEN & VGW
  # A16 & A17 & /BS & /DS & DTACK & GMEM & Q0 & SYSRESET &
    VGADDEN & VGE & VGTXEN & VGW;
```

P16R8

```
              ---------\     /----------
             /          \   /           /
            /            -----         /
     clk  /   1                  20  / Vcc
         /                           /
      BS /   2                  19  / VGTXEN
         /                           /
      DS /   3                  18  / VGADDEN
         /                           /
     NC2 /   4                  17  / VGE
         /                           /
   WRITE /   5                  16  / VGW
         /                           /
 SYSRESET/   6                  15  / DTACK
         /                           /
     A17 /   7                  14  / GMEM
         /                           /
     A16 /   8                  13  / Q0
         /                           /
  STRTACS/   9                  12  / Q1
         /                           /
     GND /  10                  11  / OE
         /                           /
          ---------------------------
```

```
          0           10          20          30
    0:  ---X---X--  -X--X-X-X-  ---X-------  --
   32:  -------X--  -X---XX-X-  ---X--X---  --
   64:  ---X-X-X--  -X--X-X---  ---X--X---  --
   96:  --X---X---  X-X-X-X-X-  ---X--X---  --
  128:  XXXXXXXXXX  XXXXXXXXXX  XXXXXXXXXX  XX
  160:  XXXXXXXXXX  XXXXXXXXXX  XXX XXXXXX  XX
  192:  XXXXXXXXXX  XXXXXXXXXX  XXXXXXXXXX  XX
  224:  XXXXXXXXXX  XXXXXXXXXX  XXXXXXXXXX  XX
  256:  -------X--  -X---XX-X-  ---X--X---  --
  288:  ---X---X--  -X--X-X-X-  ---X-------  --
  320:  --X-----X-  ------XX-X-  ---X--X---  --
  352:  ---X-X-X--  -X--X-X---  ---X--X---  --
  384:  --X---X---  X---X-X-X-  ---X--X---  --
  416:  XXXXXXXXXX  XXXXXXXXXX  XXXXXXXXXX  XX
  448:  XXXXXXXXXX  XXXXXXXXXX  XXXXXXXXXX  XX
  480:  XXXXXXXXXX  XXXXXXXXXX  XXXXXXXXXX  XX
  512:  ---X---X--  -X--X-X-X-  ---X-------  --
  544:  --X-----X-  ------XX-X-  ---X--X---  --
  576:  ---X-X-X--  -X--X-X---  ---X--X---  --
  608:  --X---X---  X-X-X-X-X-  ---X--X---  --
  640:  XXXXXXXXXX  XXXXXXXXXX  XXXXXXXXXX  XX
  672:  XXXXXXXXXX  XXXXXXXXXX  XXXXXXXXXX  XX
  704:  XXXXXXXXXX  XXXXXXXXXX  XXXXXXXXXX  XX
  736:  XXXXXXXXXX  XXXXXXXXXX  XXXXXXXXXX  XX
  768:  -------X--  -X---XX-X-  ---X--X---  --
  800:  --X-----X-  ------XX-X-  ---X--X---  --
  832:  --X---X---  X--XX-X-X-  ---X--X---  --
  864:  XXXXXXXXXX  XXXXXXXXXX  XXXXXXXXXX  XX
  896:  XXXXXXXXXX  XXXXXXXXXX  XXXXXXXXXX  XX
  928:  XXXXXXXXXX  XXXXXXXXXX  XXXXXXXXXX  XX
  960:  XXXXXXXXXX  XXXXXXXXXX  XXXXXXXXXX  XX
  992:  XXXXXXXXXX  XXXXXXXXXX  XXXXXXXXXX  XX
 1024:  ---X---X--  X----XX--X  ---X--X---  --
 1056:  ---X---X--  -X--X-X-X-  ---X---X--  --
 1088:  ---X---X--  -X---XX-X-  ---X--X---  --
 1120:  ---X-X-X--  -X--X-X--X  ---X--X---  --
```

```
1152:  --X--XX---  X---X-X--X  ---X--X---  --
1184:  XXXXXXXXXX  XXXXXXXXXX  XXXXXXXXXX  XX
1216:  XXXXXXXXXX  XXXXXXXXXX  XXXXXXXXXX  XX
1248:  XXXXXXXXXX  XXXXXXXXXX  XXXXXXXXXX  XX
1280:  ---X---X--  X-----XX--X  ---X--X---  --
1312:  --------X--  -X----XX-X-  ---X--X---  --
1344:  ---X---X--  -X--X-X-X-  ---X------  --
1376:  --X----X--  ------XX-X-  ---X--X---  --
1408:  ---X-X-X--  -X---X-X---  ---X--X---  --
1440:  --X--XX---  X----X-X---  ---X--X---  --
1472:  ---X---X--  X---X-X-X-  ---X------  --
1504:  -XX--XX---  X----X-X-X-  X----X-X---  --
1536:  ---X---X--  -X--X-X-X-  ---X--X---  --
1568:  --X---X---  X---X-X-X-  ---X---XX-  --
1600:  -XX--XX---  X---X-X-X-  X-X-X-X---  --
1632:  XXXXXXXXXX  XXXXXXXXXX  XXXXXXXXXX  XX
1664:  XXXXXXXXXX  XXXXXXXXXX  XXXXXXXXXX  XX
1696:  XXXXXXXXXX  XXXXXXX XX  XXXXXXXXXX  XX
1728:  XXXXXXXXXX  XXXXXXX-XX  XXXXXXXXXX  XX
1760:  XXXXXXXXXX  XXXXXXXXXX  XXXXXXXXXX  XX
1792:  XXXXXXXXXX  XXXXXXXXXX  XXXXXXXXXX  XX
1824:  XXXXXXXXXX  XXXXXXXXXX  XXXXXXXXXX  XX
1856:  XXXXXXXXXX  XXXXXXXXXX  XXXXXXXXXX  XX
1888:  XXXXXXXXXX  XXXXXXXXXX  XXXXXXXXXX  XX
1920:  XXXXXXXXXX  XXXXXXXXXX  XXXXXXXXXX  XX
1952:  XXXXXXXXXX  XXXXXXXXXX  XXXXXXXXXX  XX
1984:  XXXXXXXXXX  XXXXXXXXXX  XXXXXXXXXX  XX
2016:  XXXXXXXXXX  XXXXXXXXXX  XXXXXXXXXX  XX 32 of 64 terms used in device P16R8 end of module PAL3
```

APPENDIX B

```
module PAL5
title 'This PAL controls the READY and WAIT lines to the 32020 and 9516
respectively.
Michael Smith COPYRIGHT 1986 BURR-BROWN LTD  17:07:1986 REV 1.0'
"This PAL controls a) The addition of 1 wait state when the 32020 accesses
"                      slow peripherals.i.e. ACIA1, ACIA2, UDC and EPROM.
"                   b) Accesses by the VMEbus when either the 32020 or the
"                      UDC has the bus.
"                   c) Enabling of the 320 data bus transceivers on the
"                      processor write cycle to avoid bus contention.
" The latches are used to synchronise the VMEbus access when GMEM is asserted
" active low.
" STRTACS controls when PAL3 starts its access and also controls the address
" buffers and data transceivers into Global ram.
" WAIT drives the DMA controller.
" READY drives the 32".
" TXEN enables the 320 data bus transceivers to control contention.
" Q1 to Q4 are delays.
" Q2 control the WE and CE signals from the DMA controller to Global ram.

IC62
     device 'P20R4';
     clk,PBG,UBG,BR,GMEM,QP,MSC pin 1,5,3,7,2,6,8;
     ACIA1CS,ACIA2CS,PCS,EPROMCS,OE,STRB,NC pin 9,10,11,14,13,4,23;
     TXEN,STRTACS,Q4,Q3,Q2,Q1,WAIT,READY pin 15,16,17,18,19,20,22,21;

Ck,X,Z = .C.,.X.,.Z.;

truth_table ((MSC,ACIA1CS,ACIA2CS,PCS,EPROMCS)->(READY))
          [ X ,   0   ,   0   , 1 ,  1   ]->[ 1 ];
          [ 0 ,   1   ,   0   , 1 ,  1   ]->[ 0 ];
          [ 1 ,   1   ,   0   , 1 ,  1   ]->[ 1 ];
          [ 0 ,   0   ,   1   , 1 ,  1   ]->[ 0 ];
          [ 1 ,   0   ,   1   , 1 ,  1   ]->[ 1 ];
          [ 0 ,   0   ,   0   , 0 ,  1   ]->[ 0 ];
```

```
                [ 1 ,   0  ,   0  ,  0 ,   1    ]->[  1  ];
                [ 0 ,   0  ,   0  ,  1 ,   0    ]->[  0  ];
                [ 1 ,   0  ,   0  ,  1 ,   0    ]->[  1  ];
equations /READY  = /PBG & /UBG & /BR
                # /PBG &  UBG & /BR
                #  PBG & /UBG & /BR & /QP;

/WAIT   = /PBG &  UBG & /Q1
                # /PBG &  UBG & /Q2;

/STRTACS = /PBG & /UBG & /GMEM
                 # /PBG & /UBG & /QP
                 # /PBG &  UBG & /Q3 & /Q2
                 #  PBG & /UBG & /QP;

truth_table ([STRB,ACIA1CS,ACIA2CS,PCS,EPROMCS]->[TXEN])
                [ 0 ,   0  ,   0  ,  1 ,   1    ]->[  1  ];
                [ 0 ,   1  ,   0  ,  1 ,   1    ]->[  0  ];
                [ 1 ,   1  ,   0  ,  1 ,   1    ]->[  1  ];
                [ 0 ,   0  ,   1  ,  1 ,   1    ]->[  0  ];
                [ 1 ,   0  ,   1  ,  1 ,   1    ]->[  1  ];
                [ 0 ,   0  ,   0  ,  0 ,   1    ]->[  0  ];
                [ 1 ,   0  ,   0  ,  0 ,   1    ]->[  1  ];
                [ 0 ,   0  ,   0  ,  1 ,   0    ]->[  0  ];
                [ 1 ,   0  ,   0  ,  1 ,   0    ]->[  1  ];
equations
        Q1:=GMEM;
        Q2:=Q1;
        Q3:=Q2;
        Q4:=Q3;

test_vectors 'test the 1 wait state access'
  ([PBG,UBG,BR,MSC,ACIA1CS,ACIA2CS,PCS,EPROMCS]->[READY])
        [ 0 , 0 ,1 , X ,  0  ,  0  , 1 , 1 ]->[ 1 ];
        [ 0 , 0 ,1 , 0 ,  1  ,  0  , 1 , 1 ]->[ 1 ];
        [ 0 , 0 ,1 , 1 ,  1  ,  0  , 1 , 1 ]->[ 1 ];
        [ 0 , 0 ,1 , 0 ,  0  ,  1  , 1 , 1 ]->[ 0 ];
        [ 0 , 0 ,1 , 1 ,  0  ,  1  , 1 , 1 ]->[ 1 ];
        [ 0 , 0 ,1 , 0 ,  0  ,  0  , 0 , 1 ]->[ 0 ];
        [ 0 , 0 ,1 , 1 ,  0  ,  0  , 0 , 1 ]->[ 1 ];
        [ 0 , 0 ,1 , 0 ,  0  ,  0  , 1 , 0 ]->[ 0 ];
        [ 0 , 0 ,1 , 1 ,  0  ,  0  , 1 , 0 ]->[ 1 ];

test_vectors 'test the VMEbus global access'
    ([Clk,PBG,UBG,BR,GMEM,QP,OE]->[STRTACS,READY,WAIT,Q1,Q2,Q3])
        [[Ck, 0 , 0 ,0 , 0 , X , 0 ]->[ 0 , 0 , 1 , X , X , X]];"-
        [[Ck, 0 , 0 ,0 , 1 , 1 , 0 ]->[ 1 , 0 , 1 , X , X , X]];" no bus
        [[Ck, 0 , 0 ,1 , 0 , X , 0 ]->[ 0 , 1 , 1 , X , X , X]];"
        [[Ck, 0 , 0 ,1 , 1 , 1 , 0 ]->[ 1 , 1 , 1 , X , X , X]];"_
        [[Ck, 0 , 1 ,0 , 1 , X , 0 ]->[ 1 , 0 , 1 , X , X , X]];"u
        [[Ck, 0 , 1 ,0 , 1 , X , 0 ]->[ 1 , 0 , 1 , 1 , 1 , 1]];"b
        [[Ck, 0 , 1 ,0 , 0 , X , 0 ]->[ 1 , 0 , 0 , 0 , 1 , 1]];"g wait
        [[Ck, 0 , 1 ,0 , 0 , X , 0 ]->[ 1 , 0 , 0 , 0 , 0 , 1]];"
        [[Ck, 0 , 1 ,0 , 0 , X , 0 ]->[ 0 , 0 , 0 , 0 , 0 , 0]];"  strtacs
        [[Ck, 0 , 1 ,0 , 1 , 1 , 0 ]->[ 0 , 0 , 0 , 1 , 0 , 0]];"h
        [[Ck, 0 , 1 ,0 , 1 , 1 , 0 ]->[ 1 , 0 , 1 , 1 , 1 , 0]];"h
        [[Ck, 0 , 1 ,0 , 1 , X , 0 ]->[ 1 , 0 , 1 , 1 , 1 , X]];"a
        [[Ck, 0 , 1 ,0 , 1 , X , 0 ]->[ 1 , 0 , 1 , 1 , 1 , 1]];"s
        [[Ck, 0 , 1 ,1 , 0 , X , 0 ]->[ 1 , 1 , 0 , 0 , 1 , 1]];" wait
        [[Ck, 0 , 1 ,1 , 0 , X , 0 ]->[ 1 , 1 , 0 , 0 , 0 , X]];"b
        [[Ck, 0 , 1 ,1 , 0 , X , 0 ]->[ 0 , 1 , 0 , 0 , 0 , 0]];"u strtacs
        [[Ck, 0 , 1 ,1 , 1 , 1 , 0 ]->[ 0 , 1 , 0 , 1 , 0 , 0]];"s
        [[Ck, 0 , 1 ,1 , 1 , 1 , 0 ]->[ 1 , 1 , 1 , 1 , 1 , X]];"
        [[Ck, 1 , 0 ,1 , 1 , 1 , 0 ]->[ 1 , 1 , 1 , X , X , X]];"-
        [[Ck, 1 , 0 ,0 , 1 , 1 , 0 ]->[ 1 , 1 , 1 , X , X , X]];" 320 has
        [[Ck, 1 , 0 ,0 , 0 , 0 , 0 ]->[ 0 , 0 , 1 , X , X , X]];" bus
        [[Ck, 1 , 0 ,1 , 0 , 0 , 0 ]->[ 0 , 1 , 1 , X , X , X]];"_
        [[Ck, 1 , 1 ,X , X , X , 0 ]->[ 1 , 1 , 1 , X , X , X]];"
```

```
test_vectors 'test the TXEN output'
             ([STRB,ACIA1CS,ACIA2CS,PCS,EPROMCS]->[TXEN])
             [ 0 ,  0  ,  0  , 1 , 1 ]->[ 1 ];
             [ 0 ,  1  ,  0  , 1 , 1 ]->[ 0 ];
             [ 1 ,  1  ,  0  , 1 , 1 ]->[ 1 ];
             [ 0 ,  0  ,  1  , 1 , 1 ]->[ 0 ];
             [ 1 ,  0  ,  1  , 1 , 1 ]->[ 1 ];
             [ 0 ,  0  ,  0  , 0 , 1 ]->[ 0 ];
             [ 1 ,  0  ,  0  , 0 , 1 ]->[ 1 ];
             [ 0 ,  0  ,  0  , 1 , 0 ]->[ 0 ];
             [ 1 ,  0  ,  0  , 1 , 0 ]->[ 1 ];

test_vectors 'test the Q outputs'
             ([clk,GMEM,OE]->[Q1,Q2,Q3,Q4])
             [CK , 1 ,0 ]->[1 ,X ,X ,X ];
             [CK , 1 ,0 ]->[1 ,1 ,X ,X ];
             [CK , 1 ,0 ]->[1 ,1 ,1 ,X ];
             [CK , 1 ,0 ]->[1 ,1 ,1 ,1 ];
             [CK , 0 ,0 ]->[0 ,1 ,1 ,1 ];
             [CK , 0 ,0 ]->[0 ,0 ,1 ,1 ];
             [CK , 0 ,0 ]->[0 ,0 ,0 ,1 ];
             [CK , 0 ,0 ]->[0 ,0 ,0 ,0 ];
             [CK , 1 ,0 ]->[1 ,0 ,0 ,0 ];
             [CK , 1 ,0 ]->[1 ,1 ,0 ,0 ];
             [CK , 1 ,0 ]->[1 ,1 ,1 ,0 ];
             [CK , 1 ,0 ]->[1 ,1 ,1 ,1 ];
             [CK , X ,1 ]->[Z ,Z ,Z ,Z ];

end PAL5
```

Page 1
ABEL(tm) Version 1.13 - Document Generator      25-Aug-86 08:12 AM
This PAL controls the READY and WAIT lines to the 32020 and 9516 respectively.
Michael Smith COPYRIGHT 1986 BURR-BROWN LTD  17:07:1986 REV 1.0
Equations for Module PAL5

Device IC62

```
    Reduced Equations:

READY = /(/BR & /PBG
          # /BR & /QP & /UBG
          # /ACIA1CS & /ACIA2CS & /EPROMCS & /MSC & PCS
          # /ACIA1CS & /ACIA2CS & EPROMCS & /MSC & /PCS
          # /ACIA1CS & ACIA2CS & EPROMCS & /MSC & PCS
          # ACIA1CS & /ACIA2CS & EPROMCS & /MSC & PCS);

WAIT = /(/PBG & /Q1 & UBG # /PBG & /Q2 & UBG);

STRTACS = /(/GMEM & /PBG & /UBG
            # /QP & /UBG
            # /PBG & /Q2 & /Q3 & UBG);

TXEN = /(/ACIA1CS & /ACIA2CS & /EPROMCS & PCS & /STRB
          # /ACIA1CS & /ACIA2CS & EPROMCS & /PCS & /STRB
          # /ACIA1CS & ACIA2CS & EPROMCS & PCS & /STRB
          # ACIA1CS & /ACIA2CS & EPROMCS & PCS & /STRB);

Q1 := /(/GMEM);

Q2 := /(/Q1);

Q3 := /(/Q2);

Q4 := /(/Q3);
```

```
                           P20R4
              ----------\   /----------
             /           \ /           /
            /             -            /
       clk /  1              24 / Vcc
            /                    /
      GMEM /  2              23 / NC
            /                    /
       UBG /  3              22 / WAIT
            /                    /
      STRB /  4              21 / READY
            /                    /
       PBG /  5              20 / Q1
            /                    /
        QP /  6              19 / Q2
            /                    /
        BR /  7              18 / Q3
            /                    /
       MSC /  8              17 / Q4
            /                    /
    ACIA1CS /  9              16 / STRTACS
            /                    /
    ACIA2CS / 10              15 / TXEN
            /                    /
       PCS / 11              14 / EPROMCS
            /                    /
       GND / 12              13 / OE
            /                    /
             -----------------------------
```

```
             0          10         20         30
    0:  ---------- ---------- ---------- ----------
   40:  ----X----- ---X-X---- ---------- ----------
   80:  ----X----- ---X-----X ---------- ----------
  120:  XXXXXXXXXX XXXXXXXXXX XXXXXXXXXX XXXXXXXXXX
  160:  XXXXXXXXXX XXXXXXXXXX XXXXXXXXXX XXXXXXXXXX
  200:  XXXXXXXXXX XXXXXXXXXX XXXXXXXXXX XXXXXXXXXX
  240:  XXXXXXXXXX XXXXXXXXXX XXXXXXXXXX XXXXXXXXXX
  280:  XXXXXXXXXX XXXXXXXXXX XXXXXXXXXX XXXXXXXXXX
  320:  ---------- ---------- ---------- ----------
  360:  ---------- ---X------ -X-------- ----------
  400:  -----X---- -------X-- -X-------- ----------
  440:  ---------- ---------- -----X---X ---X--X--X
  480:  ---------- ---------- -----X---X ---X---XX-
  520:  ---------- ---------- -----X---X --X---X-X-
  560:  ---------- ---------- -----X--X- ---X--X-X-
  600:  XXXXXXXXXX XXXXXXXXXX XXXXXXXXXX XXXXXXXXXX
  640:  -X-------- ---------- ---------- ----------
  680:  XXXXXXXXXX XXXXXXXXXX XXXXXXXXXX XXXXXXXXXX
  720:  XXXXXXXXXX XXXXXXXXXX XXXXXXXXXX XXXXXXXXXX
  760:  XXXXXXXXXX XXXXXXXXXX XXXXXXXXXX XXXXXXXXXX
  800:  XXXXXXXXXX XXXXXXXXXX XXXXXXXXXX XXXXXXXXXX
  840:  XXXXXXXXXX XXXXXXXXXX XXXXXXXXXX XXXXXXXXXX
  880:  XXXXXXXXXX XXXXXXXXXX XXXXXXXXXX XXXXXXXXXX
  920:  XXXXXXXXXX XXXXXXXXXX XXXXXXXXXX XXXXXXXXXX
  960:  ---------- -----X---- ---------- ----------
 1000:  XXXXXXXXXX XXXXXXXXXX XXXXXXXXXX XXXXXXXXXX
 1040:  XXXXXXXXXX XXXXXXXXXX XXXXXXXXXX XXXXXXXXXX
 1080:  XXXXXXXXXX XXXXXXXXXX XXXXXXXXXX XXXXXXXXXX
 1120:  XXXXXXXXXX XXXXXXXXXX XXXXXXXXXX XXXXXXXXXX
 1160:  XXXXXXXXXX XXXXXXXXXX XXXXXXXXXX XXXXXXXXXX
 1200:  XXXXXXXXXX XXXXXXXXXX XXXXXXXXXX XXXXXXXXXX
 1240:  XXXXXXXXXX XXXXXXXXXX XXXXXXXXXX XXXXXXXXXX
 1280:  ---------- --------X- ---------- ----------
 1320:  XXXXXXXXXX XXXXXXXXXX XXXXXXXXXX XXXXXXXXXX
 1360:  XXXXXXXXXX XXXXXXXXXX XXXXXXXXXX XXXXXXXXXX
 1400:  XXXXXXXXXX XXXXXXXXXX XXXXXXXXXX XXXXXXXXXX
 1440:  XXXXXXXXXX XXXXXXXXXX XXXXXXXXXX XXXXXXXXXX
 1480:  XXXXXXXXXX XXXXXXXXXX XXXXXXXXXX XXXXXXXXXX
 1520:  XXXXXXXXXX XXXXXXXXXX XXXXXXXXXX XXXXXXXXXX
```

What is claimed is:

1. A digital processing circuit comprising in combination:
   (a) a first local processor connected to a first address bus and a first data bus;
   (b) a second local processor connected to an input/output bus;
   (c) a second data bus and a second address bus;
   (d) a shared resource connected to a shared resource address bus and a shared resource data bus;
   (e) first transceiver means for selectively coupling the first data bus to the shared resource data bus and first address buffer means for selectively coupling the shared resource address bus to the first address bus;
   (f) second transceiver means for selectively coupling the shared resource data bus to the second data bus and second address buffer means for selectively coupling the shared resource address bus to the second address bus;
   (g) third transceiver means for selectively coupling the shared resource data bus to the input/output bus and third address buffer means for selectively coupling the shared resource address bus to the input/output bus;
   (h) means for arbitrating between a first bus request signal produced by the local processor and a second bus request signal produced by the input/output controller for generating a first bus grant signal or a second bus grant signal;
   (i) means responsive to the first bus grant signal for enabling the first address buffer means and the first transceiver means to effectuate accessing of the shared resource by the local processor;
   (j) means responsive to the second bus grant signal for enabling the third address buffer means and the third transceiver means to effectuate accessing of the shared resource by the input/output controller;
   (k) a system bus and buffer means for coupling the system bus to the second address bus and the second data bus;
   (l) a system processor coupled to the system bus and having higher priority than either the local processor or the input/output controller;
   (m) means responsive to an access request by the system processor for producing a third bus request signal for inserting a first preselected number of wait states into the local processor if the local processor is accessing the shared resource and for inserting a second preselected number of wait states into the input/output controller if the input/output controller is accessing the shared resource;
   (n) means for enabling the second address buffer to couple the second address bus to the shared resource address bus while the first preselected number of wait states are inserted and means for enabling the second transceiver means to couple the shared resource data bus to the second data bus while the first preselected number of wait states are inserted, and means for enabling the third address buffer to couple the input/output bus to the shared resource address bus while the second preselected number of wait states are inserted, and means for enabling the third transceiver means to couple the input/output bus to the shared resource data bus while the second preselected number of wait states are inserted, thereby effectuating top priority accessing of the shared resource by the system processor without any arbitration between the system processor and the local processor or the input/output controller.

2. A digital processing circuit comprising in combination:
   (a) a local processor connected to a first address bus and a first data bus;
   (b) an input/output controller connected to an input/output bus;
   (c) a second data bus and a second address bus;
   (d) a shared memory connected to a shared memory address bus and a shared memory data bus;
   (e) first transceiver means for selectively coupling the first data bus to the shared memory data bus and first address buffer means for selectively coupling the shared memory address bus to the first address bus;
   (f) second transceiver means for selectively coupling the shared memory data bus to the second data bus and second address buffer means for selectively coupling the shared memory address to the second address bus;
   (g) third transceiver means for selectively coupling the shared memory data bus to the input/output bus and third address buffer means for selectively coupling the shared memory address bus to the input/output bus;
   (h) means for arbitrating between a first bus request signal produced by the local processor and a second bus request signal produced by the input/output controller for generating a first bus grant signal or a second bus grant signal;
   (i) means responsive to the first bus grant signal for enabling the first address buffer means and the first transceiver means to effectuate accessing of the shared memory by the local processor;
   (j) means responsive to the second bus grant signal for enabling the third address buffer means and the third transceiver means to effectuate accessing of the shared memory by the input/output controller;
   (k) a system bus and buffer means for coupling the system bus to the second address bus and the second data bus;
   (l) a system coupled to the system bus and having higher priority than either the local processor or the input/output controller;
   (m) means responsive to an access request by the system processor for producing a third bus request signal for inserting a first preselected number of wait states into the local processor if the local processor is accessing the shared memory and for inserting a second preselected number of wait states into the input/output controller if the input/output controller is accessing the shared memory;
   (n) means for enabling the second address buffer to couple the second address bus to the shared memory address bus while the first preselected number of wait states are inserted and means for enabling the second transceiver means to couple the shared memory data bus to the second data bus while the first preselected number of wait states are inserted, and means for enabling the third address buffer to couple the input/output bus to the shared memory address bus while the second preselected number of wait states are inserted, and means for enabling the third transceiver means to couple the input/output bus to the shared memory data bus while the second preselected number of wait states are inserted, thereby effectuating top priority accessing of the shared memory by the system processor without any arbitration between the system processor and the local processor or the input/output controller.

3. The digital processing circuit of claim 2 wherein the system bus includes address conductors and data conductors, and fourth transceiver means for selectively coupling the data conductors to the second data bus, and fourth address buffer means for selectively coupling the address conductors to the second address bus.

4. The digital processing circuit of claim 3 including fifth transceiver means for selectively coupling the first data bus to the second data bus and fifth address buffer means for selectively coupling the first address bus to the second address bus.

5. The digital processing circuit of claim 2 including sixth transceiver means for selectively coupling the first data bus to the input/output bus.

6. The digital processing circuit of claim 5 including decoding means for decoding an address on the system bus to produce the third bus request signal.

7. The digital processing circuit of claim 5 wherein the wait state inserting means includes timing circuit means for synchronizing the first preselected number of wait states with the accessing of the shared memory by the local processor and synchronizing the second preselected number of wait states with accessing of the shared memory by the input/output controller.

8. The digital processing circuit of claim 7 wherein the processor includes a first input for receiving a wait signal and halts execution of a present instruction in response to a received wait signal, the wait state inserting means inserting the first preselected number of wait states into the local processor by producing wait signals on the first input in synchronization with the accessing of the shared memory by the local processor, and wherein the input/output controller includes a second input for receiving a wait signal and halts execution of a present input/output bus controlling operation in response to a received wait signal, the wait state inserting means inserting the second preselected number of wait states into the input/output controller by producing wait signals on the second input in synchronization with the accessing of the shared memory by the input/output controller.

9. The digital processing circuit of claim 8 wherein the local processor includes means responsive to a wait signal received thereby for disabling the first address buffer means and the first transceiver means to isolate the first address bus and the first data bus, respectively, from the global memory.

10. The digital processing circuit of claim 9 wherein the input/output controller includes means responsive to a wait signal received thereby for disabling the third address buffer means and the third transceiver means from the input/output bus to isolate the input/output bus from the shared memory.

11. The digital processing circuit of claim 10 wherein the local processor includes an internal local memory and can access the internal local memory while the first preselected number of wait states are being received on the first input.

12. The digital processing circuit of claim 11 including a random access memory coupled to the first address bus and the first data bus to allow down loading of programs via the system bus and/or the input/output bus into the random access memory.

13. A method for effectuating high priority requests by a system processor for access via a system bus to a shared memory that is shared by a first local processor and a second local processor, the method comprising the steps of:

(a) operating the first local processor to produce a first bus request signal;
(b) if the shared memory is not presently being accessed, performing the steps of
  i. producing a first bus grant signal,
  ii. producing a first ready signal on a first conductor in response to the first bus grant signal and conducting the first ready signal on the first conductor to the first local processor to indicate that the first local processor may access the shared memory,
  iii. producing a first enable signal and a first write signal to effectuate accessing of the shared memory by the first local processor,
(c) operating the second local processor to produce a second bus request signal;
(d) if the shared memory is not presently being accessed, performing the steps of
  i. producing a second bus grant signal,
  ii. producing a second ready signal on a second conductor in response to the second bus grant signal and conducting the second ready signal on the second conductor to the second local processor to indicate that the second local processor may access the shared memory,
  iii. producing a second enable signal and a second write signal to effectuate accessing of the shared memory by the second local processor;
(e) operating the system processor to generate a first address for accessing the shared memory;
(f) decoding the first address to produce a third bus request signal and synchronizing the third bus request signal with any ongoing accessing of the shared memory by the first local processor or the second local processor;
(g) producing a first wait signal on the first conductor synchronized with accessing of the shared memory by the first local processor if the first ready signal is on the first conductor, and producing a second wait signal on the second conductor in synchronization with accessing of the shared memory by the second local processor if the second ready signal is on the second conductor;
(h) producing a third enable signal and a third write signal to effectuate coupling of the system processor to the shared memory to effectuate reading and writing thereof by the system processor without any arbitrating between the system processor and either the first local processor or the second local processor for access to the shared memory.

14. The method of claim 13 including generating the third enable signal and the third write signal if neither the first local processor nor the second local processor is accessing the shared memory.

15. The method of claim 14 including using the first enable signal both to enable a first address buffer to couple an address bus of the first local processor to an address bus of the shared memory and to enable a first transceiver circuit to couple a data bus of the first local processor to a data bus of the shared memory during the first ready signal, and to disable the first address buffer and the first transceiver circuit to decouple the first local processors from the shared memory during the first wait signal.

16. the method of claim 15 including using the second enable signal both to enable a second address buffer to couple an address bus of the second local processor to the address bus of the shared memory and to enable a second transceiver circuit to couple a data bus of the second local processor to the data bus of the shared memory during the second ready signal, and to disable the second address buffer and the second transceiver circuit to decouple the second local processor from the shared memory during the second wait signal.

17. The method of claim 16 including using the third enable signal both to enable a third address buffer to couple an address bus of the system processor to the address bus of the shared memory and to enable a third transceiver circuit to couple a data bus of the system processor to the data bus of the shared memory during the first and second wait signals, and to disable the third address buffer and the third transceiver circuit to decouple the system processor from the shared memory when the first and second wait signals are not present.

18. The method of claim 17 wherein the first local processor includes an internal local memory, the method including operating the first local processor to access the internal local memory to execute a program and simultaneously operating the system processor or the second local processor to access the shared memory.

19. The method of claim 18 including operating the first local processor to access both the local internal memory and the shared memory to transfer data between the local internal memory and the shared memory.

* * * * *